United States Patent [19]
Frates

[11] Patent Number: 6,046,437
[45] Date of Patent: Apr. 4, 2000

[54] HIGH OUTPUT DEVICE FOR LIQUIFYING OR REDUCING THE VISCOSITY OF MATERIALS

[75] Inventor: Paul S. Frates, Lawrenceville, Ga.

[73] Assignee: Nordson Corporation, Westlake, Ohio

[21] Appl. No.: 09/182,247

[22] Filed: Oct. 29, 1998

[51] Int. Cl.[7] ..................................................... B67D 5/62
[52] U.S. Cl. ........................................ 219/426; 222/146.5
[58] Field of Search .................................. 219/421, 422, 219/424, 425, 426; 222/146.1, 146.2, 146.3, 146.4, 146.5; 126/343.5

[56] References Cited

U.S. PATENT DOCUMENTS

| D. 341,146 | 11/1993 | Stankosky | D15/144.2 |
|---|---|---|---|
| 2,478,893 | 8/1949 | Brant | 241/65 |
| 2,630,248 | 3/1953 | Hinz | 222/258 |
| 3,282,469 | 11/1966 | Skonberg | 222/146 |
| 3,412,903 | 11/1968 | Riper, Jr. et al. | 222/146 |
| 3,546,430 | 12/1970 | Kane | 219/316 |
| 3,637,111 | 1/1972 | McCreary | 222/146 |
| 3,758,003 | 9/1973 | Kautz et al. | 222/146 |
| 3,976,229 | 8/1976 | Jackson | 222/146 |
| 3,982,669 | 9/1976 | Moore | 222/146 |
| 4,073,409 | 2/1978 | Gardner et al. | 222/146 |
| 4,090,640 | 5/1978 | Smith et al. | 222/52 |
| 4,195,755 | 4/1980 | Slautterback et al. | 222/146 |
| 4,227,069 | 10/1980 | Gardner et al. | 219/421 |
| 4,344,547 | 8/1982 | Moore | 222/146 |
| 4,355,734 | 10/1982 | Moore | 222/146.5 |
| 4,592,491 | 6/1986 | Chollet | 222/146.5 |

(List continued on next page.)

FOREIGN PATENT DOCUMENTS

0901981 A1  3/1999  European Pat. Off. .

OTHER PUBLICATIONS

Nordson Corporation, *Nordson® Bulk Melter/Applicators*, Issued Jul. 1979.

Nordson Corporation, *Nordson® Product Information, Model 5505 Bulk Melter/Applicator*, Issued 1981–1982.

Nordson Corporation, *Nordson® Model 5505 & Model 5510 Bulk Melter/Applicator Systems*, Issued May 1980.

Meltex Corp., *Meltex® Drum Melter DG 21*, (published on or before 1989).

LTI Corporation, *DM–55P Bulk Unloader/Dispenser System*, Aug. 1982.

LTI Corporation, *LTI's DM55 Drum Unloader/Dispenser*, Undated.

GRACO LTI, *Dynamelt® 5; Portable Hot Melt Unloader/Dispenser*, Undated.

GRACO LTI, *Dynamelt® DM–55 Hot Melt Unloader/Dispenser*, Undated.

Nordson Corporation, *Nordson® Bulk Melter Systems*, Issued Sep. 1990.

Meltex Corp., *Meltex® Information Drum Melters*, (published on or before 1989).

Nordson Corporation, *Nordson® Series 5000 Drum Melters Options*, Publication, Issued Feb. 1992.

Meltex Corp., *Meltex® Drum Unloader DP 201*, (published on or before 1989).

Uniflow®, *Platen Options*, undated.

Meltex Corp., *Meltex® Hydraulic Drum Melter DG 201H*, (published on or before 1989).

(List continued on next page.)

*Primary Examiner*—John A. Jeffery
*Attorney, Agent, or Firm*—Wood, Herron & Evans, L.L.P.

[57] ABSTRACT

Apparatus for liquifying material in the form of an unloading device includes a platen which may have a one-piece or two-piece structure. The platen preferably includes a plurality of fins with the openings between the fins communicating with a plurality of flow passages in the platen and a plurality of channels also communicating with the flow passages and located interiorly in the platen behind the fins. The various flow passages and channels lead to a discharge flow passage. The discharge flow passage may be directly connected to a pump or one or more discharge flow passages may lead to a chamber of the platen which further heats the liquified material before it is pumped from the platen.

35 Claims, 5 Drawing Sheets

U.S. PATENT DOCUMENTS

| | | | |
|---|---|---|---|
| 4,632,277 | 12/1986 | Pallante | 222/146.2 |
| 4,635,820 | 1/1987 | Marshall | 222/63 |
| 4,661,688 | 4/1987 | Gabryszewski | 219/421 |
| 5,078,321 | 1/1992 | Davis et al. | 239/224 |
| 5,148,947 | 9/1992 | Epp et al. | 222/146.5 |
| 5,173,308 | 12/1992 | Scantland et al. | 247/79 |
| 5,257,723 | 11/1993 | Bagung | 222/1 |
| 5,971,211 | 10/1999 | Farley et al. | 222/146.5 |

OTHER PUBLICATIONS

Meltex Corp., *Meltex® Drum Melter DG 201*, Feb. 1991.

Meltex Corp., *Meltex® Information Faβschmelzer*, 1986.

Mercer Corporation, *Uniflow® Fibre Drum Unloader*, Undated.

HIGH OUTPUT DEVICE FOR LIQUIFYING OR REDUCING THE VISCOSITY OF MATERIALS

FIELD OF THE INVENTION

The present invention generally relates to apparatus for liquifying or reducing the viscosity of materials such as thermoplastic or various natural or synthetic rubbers. More particularly, the invention relates to drum unloaders using heated platens to heat and pump material from a container such as a drum, barrel, or pail.

BACKGROUND OF THE INVENTION

Numerous types of material heating, melting and dispensing units exist for a variety of industrial applications. One type of device includes an arrangement in which a heated platen is lowered into the open end of a container for melting and/or liquifying material contained therein and pumping the material, for example, to various types of dispensing devices. The platens generally have an engagement surface which may either be generally smooth or may have a plurality of projecting heat exchanging elements, such as fins. A platen having a smooth heated surface leaves less residue in the bottom of the container and is typically easier to clean than a finned platen. However, smooth platens generally have lower output capabilities than a finned platen. Therefore, smooth platens may not be suitable for use with dispensers demanding a high flow rate of material from the platen. In these instances, the projecting heat exchanging elements or fins on a platen can provide a higher melt rate and therefore higher output from the platen. Also, due to the increased contact with the heated surfaces of the fins, higher temperatures are possible.

Another problematic area in this technology relates to the downtime experienced when changing over from a depleted container of material to a new container of material. Often, a production process stops during this changeover time and this effectively results in higher production costs. One solution to this problem involves using a two unit system in which a second drum unloader takes over while the first unit is reloaded with a new container of material. This is an undesirable solution in many cases due to the increased cost of the two unit system.

Finally, many platens heat the material sufficiently to allow it to be pumped, however, the material may not be heated close to a desired application temperature. For this reason, downstream hoses, manifolds and other components must supply additional heating energy to the material.

While current and past finned platens have served certain needs in regard to increasing melt temperature and/or increasing flow rate, improvements are constantly desired in the industry. Increasing the flow rate even further and/or increasing the temperature of the liquified thermoplastic material is a continuing need. There are increasing numbers of industrial applications requiring greater output from a drum unloader. Increasing the output from a drum unloader can decrease overall production time and may enable the supply of additional downstream dispensing devices with the proper amount of pressurized liquid material. Finally, increasing the heating capacity of a platen can reduce the need for additional heat energy requirements between the platen and the ultimate dispensing devices.

For reasons such as those described above, it would be desirable to provide apparatus including a platen for heating, melting and dispensing various materials such as solid thermoplastic or rubber materials with higher liquid output and/or temperature.

SUMMARY OF THE INVENTION

In one preferred embodiment of the invention, apparatus for heating and reducing the viscosity of various materials includes a platen having first and second spaced apart surfaces. The first surface is an exterior surface including a plurality of projecting heat exchanging elements, such as fins, with openings therebetween. The heat exchanging elements contact, heat and liquify or, in other words, reduce the viscosity of various materials. As examples, these materials may include various solid, semi-solid or viscous thermoplastic or rubber based materials. The second surface is an interior surface and the platen further includes at least one flow passage for receiving melted material and communicating with the openings between the heat exchanging elements and also communicating with the second surface. The flow passage may advantageously comprise one or more elongate slots, however, passages of other shapes may be used as well. The second surface forms at least part of an elongate channel communicating with the slot and further communicating with a discharge flow passage which is adapted to communicate with a pump. In this regard, the channel may be formed, for example, as a recess in a surface of a multi-piece platen structure or as a bore which is cast within or otherwise formed in a one-piece platen structure. At least one heater is thermally coupled to the heat exchanging elements for supplying heat to melt the material. Liquified material will flow through the openings between the heat exchanging elements, and through the one or more slots in the platen and the elongate channel to the discharge flow passage. From the discharge flow passage, the liquified material may be pumped to one or more downstream dispensers.

In at least one preferred embodiment, the platen further includes a separate fin plate and mounting member. The fin plate includes the fins on one side thereof and is fastened to the mounting member on the other side thereof. The elongated slot or slots extend through the fin plate and are located generally between the fins and the mounting member. In a two-piece embodiment such as this, the first and second spaced apart surfaces may each be on the fin plate, with the second surface abutting the mounting member. The elongate slot extends transversely between the first and second surfaces and preferably lengthwise across the platen. The elongate channel is preferably contained in the second surface of the fin plate and intersects the elongate slot for providing a fluid flow path therebetween. As one alternative, the elongate channel may instead be located in the abutting surface of the mounting member.

To achieve higher flow rates and heat exchanging surface area, a plurality of the elongate channels and elongate slots establish multiple heated flow paths to the discharge flow passage. The platen is preferably formed from aluminum and includes a plurality of embedded heaters which supply heat to the entire platen, including the heat exchanging elements and the walls of the various flow passages, e.g., the elongate channels and slots. The elongate slots advantageously extend transverse the fins to communicate with the multiple openings between the spaced apart fins.

In another embodiment of the invention, the platen includes first and second sides and a first plurality of heat exchanging elements, which may again be fins, extending from the first side and adapted to contact and melt the material. The platen in this embodiment may be multi-piece, but is preferably a one-piece platen for better heat transfer capability. A chamber is disposed on the second side of the platen and communicates with the first side through at leas t one flow passage. The chamber is adapted for connection with a pump for pumping liquified material out of the chamber. The interior of the chamber includes at least one projecting heat exchanging element, and most preferably a second plurality of heated fins. The heat exchanging elements within the chamber can help maintain or increase the temperature of the liquified material prior to pumping the material from the chamber. The chamber itself provides additional space for liquified material, for example, to be pumped to dispensers during a drum or container changeover procedure.

Yet another embodiment of the invention incorporates principles generally from the first and second embodiments. More specifically, a platen may include first and second sides with a first plurality of heat exchanging elements extending from the first side and adapted to contact and melt the material. A chamber is again disposed on the second side and communicates with the first side through a plurality of flow passages. The chamber may include a second plurality of heat exchanging elements and preferably receives a pump. A plurality of flow passages communicate with openings between the first plurality of heat exchanging elements and further communicate with at least one flow passage leading to the chamber. At least one heater is thermally coupled to the first plurality of heat exchanging elements for supplying heat to melt the material. The same heater or a different heater may be thermally coupled to the second plurality of heat exchanging elements. This platen is preferably a one-piece platen, however, it may comprise a multi-piece platen as well. At least one flow passage intersects with the flow passage or passages communicating with the openings between the first plurality of heat exchanging elements. These intersecting flow passages provide a fluid flow path to the chamber. A central flow passage may also be provided in the platen to communicate with a central portion of the chamber. As with the second embodiment, additional peripheral flow passages may also be provided in the platen to direct liquified material from the openings between the first plurality of heat exchanging elements into the chamber.

The invention further contemplates methods of liquifying and, for example, unloading the material from a container. For example, one method may comprise engaging a plurality of projecting heating elements of a heated platen with the material to produce liquified, heated material. The material is moved through a plurality of flow passages in the platen which communicate with openings between the projecting heating elements. The material is further moved from the flow passages into a plurality of channels in the platen communicating with a discharge flow passage to deliver the material to an opposite side of the platen. Other methods include engaging projecting heat exchanging elements of a platen with the material to produce liquified, heated material, moving the material into a chamber disposed on an opposite side of the platen, supplying additional heat to the material in the chamber using a projecting heat exchanging element in the chamber, and pumping the material out of the chamber. It will be understood that additional methods and manners of defining such methods within the spirit and intended scope of the invention are possible as well.

Various manners of combining the features of each embodiment are possible and are within the scope of the inventive concepts, although particular combinations of features will be described herein without intending to limit the scope of the invention. The invention is particularly suited to melt or liquify solid thermoplastic materials, however, the heating and reduction in viscosity of various solid, semi-solid or viscous materials fall within the definition of liquifying or melting material in accordance with the inventive principles. Additional advantages, objectives, and features of the invention will become more readily apparent to those of ordinary skill in the art upon review of the following detailed description of the preferred embodiments taken in conjunction with the accompanying drawings.

DETAILED DESCRIPTION OF THE PREFERRED EMBODIMENTS

Figure 1:
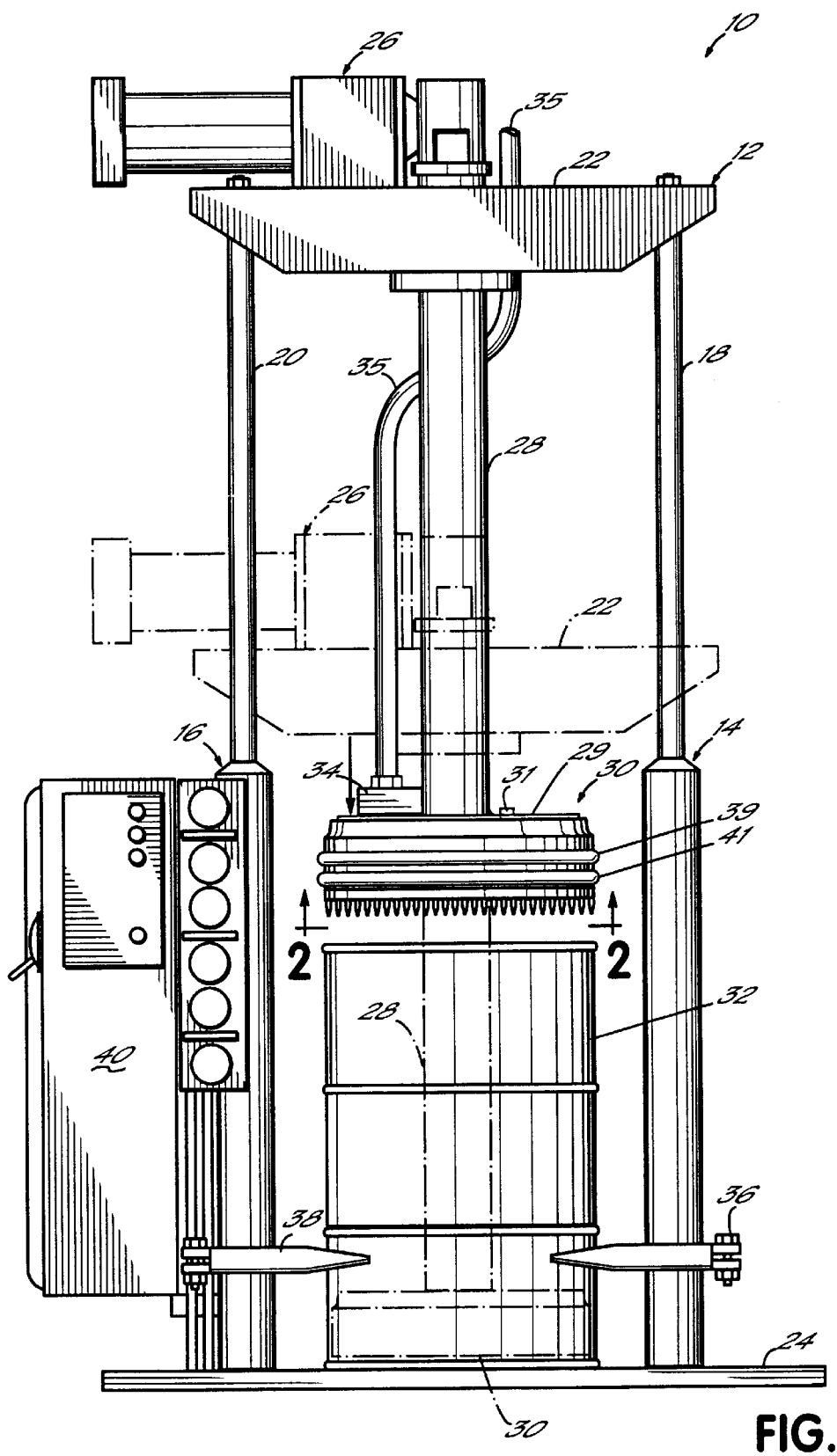
FIG. 1 is a side elevational view of an apparatus utilizing one embodiment of the invention.
Figure 2:
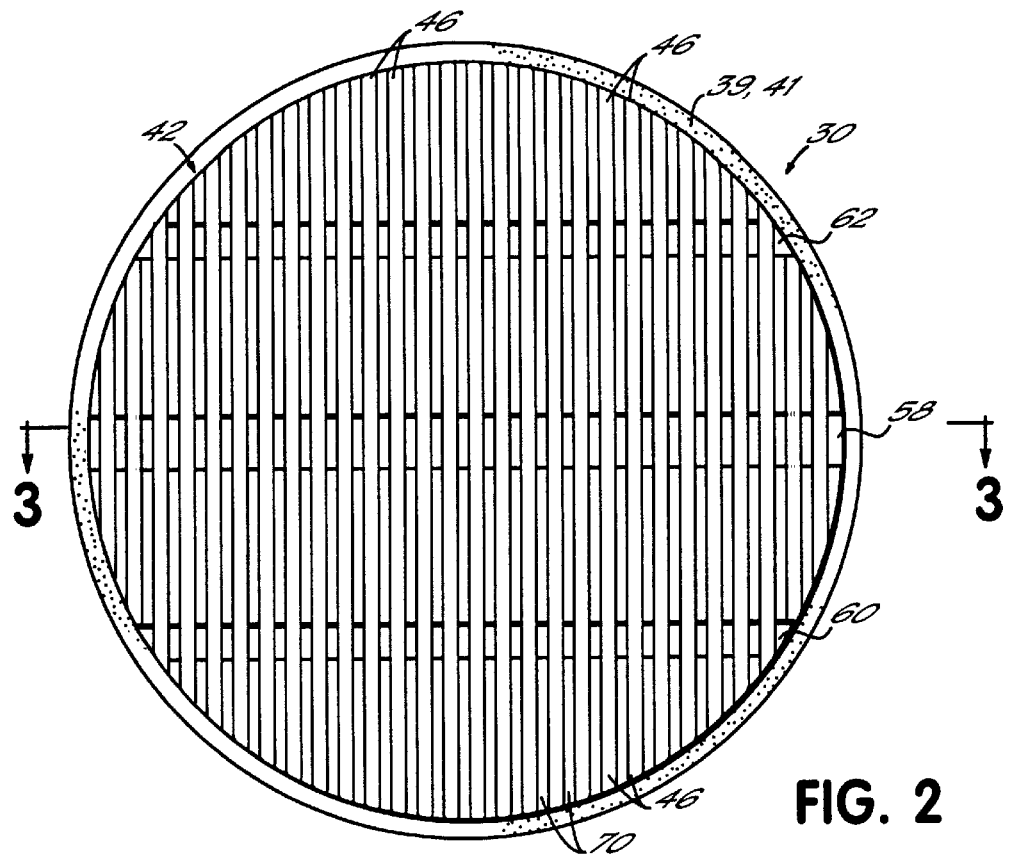
FIG. 2 is a bottom view of a first embodiment of a platen constructed in accordance with the invention and taken generally along line 2—2 of FIG. 1.
Figure 3:
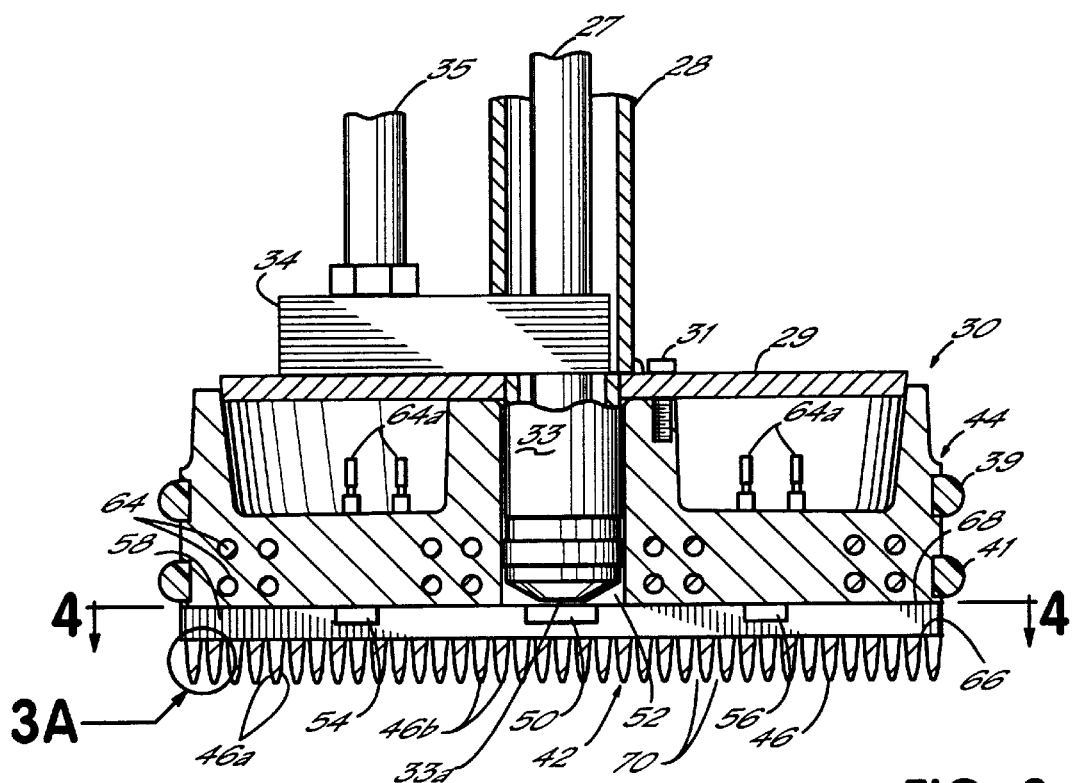
FIG. 3 is a partially fragmented cross sectional view of the platen shown in FIG. 2 and taken along line 3—3 thereof.

Referring generally to FIGS. 1–4, an apparatus 10 for melting solid thermoplastic material is shown in accordance with one embodiment of the invention. Although the invention will be described in context with its current main use of melting or liquifying solid thermoplastics, its uses are actually broader based as discussed above. Apparatus 10 generally includes a platen support and moving device 12 which, in one typical form, includes a pair of air-actuated cylinders 14, 16 each having respective retractable and extendable cylinder rods 18, 20. Rods 18, 20 are connected to a cross head support member 22 at upper ends thereof and cylinders 14, 16 are further connected to a suitable base structure 24. It will be understood that additional support members connected between cylinders 14, 16 and base 24 are typically used but are deleted from the drawing for clarity. A motor assembly 26 is affixed to cross head support member 22 and includes a drive shaft 27 extending through a tube 28 rigidly mounted, such as by welding, to a flange 29. Flange 29 is bolted by fasteners 31 to a platen 30 constructed in accordance with one preferred embodiment. As shown in FIG. 3, drive shaft 27 extends from motor assembly 26 through tube 28 and drives a pump 33. Pump 33 pumps liquified material from platen 30 into a manifold 34 as will be described in detail below. A hose or conduit 35 is connected to manifold 34 to direct the liquified material to downstream applications.

Platen 30 is mounted to be moved downwardly into a drum 32 of material, such as a solid hot melt adhesive, a sealant, or a caulk. This material may be formed as a solid slug contained in drum 32. Other containers, such as barrels and pails may be used in conjunction with apparatus 10 as well. These containers may range in volume, for example, from five gallons to 55 gallons. Drum 32 may be positioned in line with platen 30 by a pair of positioners 36, 38, for example, connected with cylinders 14, 16 or other support structure. Finally, a control box 40 is shown for generally controlling apparatus 10, such as in a conventional manner well known in the art, to effect the movement of platen 30 into drum 32 and to control the heating and pumping equipment associated therewith.

Figure 3A:
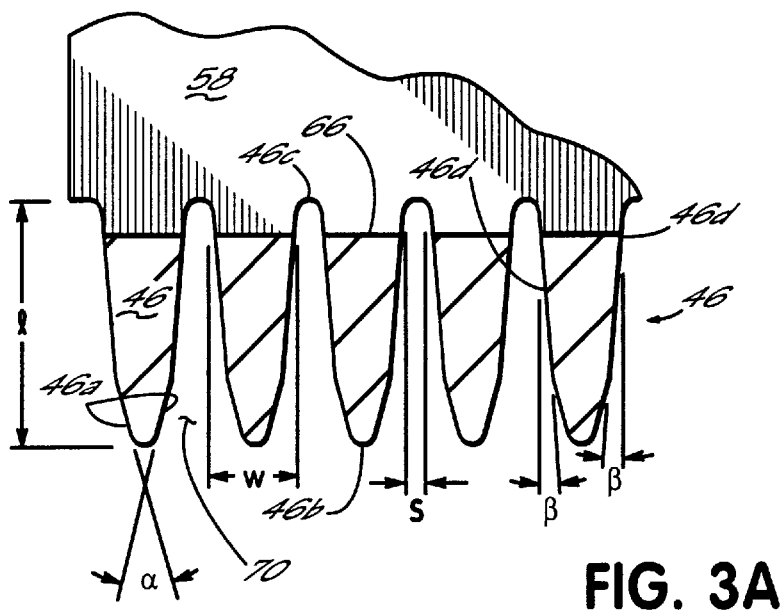
FIG. 3A is an enlarged view of encircled portion "3A" of FIG. 3.

Platen 30 includes conventional seals 39, 41 for engaging the inner wall of drum 32. Platen 30 can include a fin plate 42 affixed to a separate mounting member 44. A unitary or one-piece construction may be used as well. Preferably, each of these components is formed from cast aluminum. Fin plate 42 may be affixed directly to mounting member 44 by a plurality of fasteners 48. A plurality of flow passages are provided preferably in fin plate 42 for allowing liquid thermoplastic material to flow through fin plate 42. As detailed in FIG. 3A, fin plate 42 includes a plurality of elongate fins 46 having tapering side surfaces 46a converging to leading edges or tips 46b. Preferably, the angle a between tapered side surfaces 46a is about 30°. Additionally, the maximum fin spacing "s" or, in other words, the width of openings 70 at the trailing edges or bases 46c of adjacent fins 46, is preferably about 0.19 of an inch. Surfaces 46d taper at second angles P of about 5°. A preferred length "l" for fins 46 is about 15⅔ inches. The preferred width w of the fins at base 46c is about 0.56 of an inch. Therefore, the ratio of length "l" to spacing "s" is about 9 and the ratio of length "l" to width "w" is about 3. It may be necessary to provide thicker portions (not shown) of certain fins 46 to accommodate fasteners in plate 42.

Figure 4:
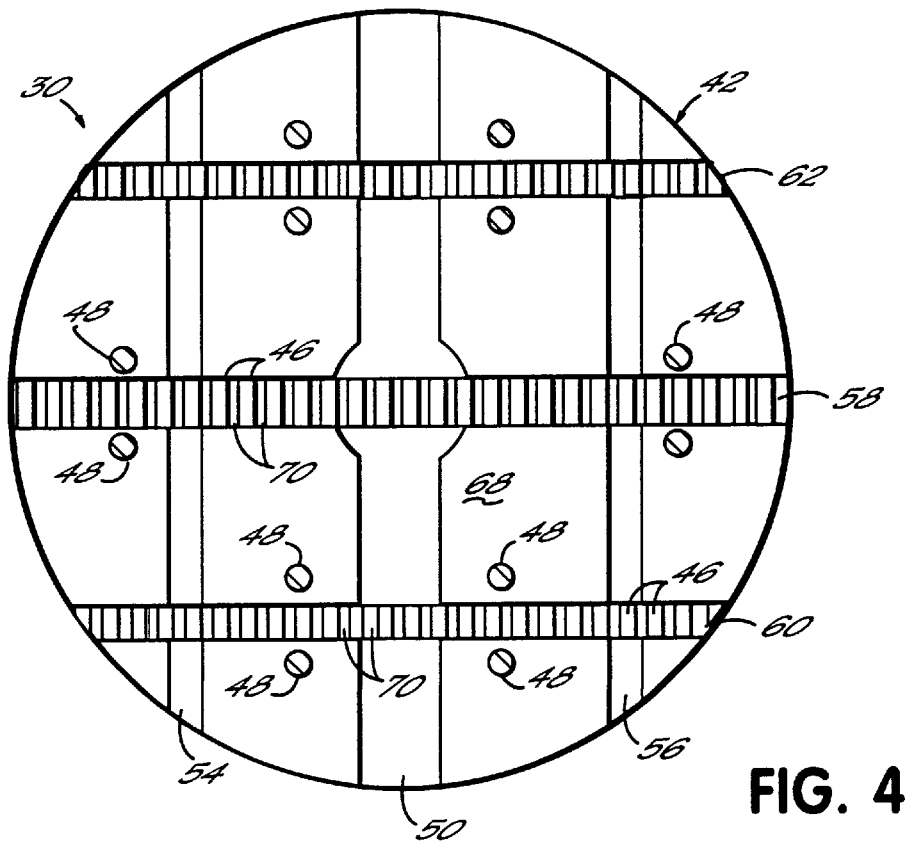
FIG. 4 is a cross sectional view of the platen shown in FIG. 3 and taken along line 4—4 thereof.

Referring particularly to FIGS. 3 and 4, a central channel or flow passage 50 in fin plate 42 communicates with a central discharge flow passage 52 in mounting member 44 and with a pump inlet 33a. Fin plate 42 further includes a pair of outer channels or flow passages 54, 56 extending parallel to central channel 50. For providing communication between fins 46 and channels or flow passages 50, 54, 56, a plurality of additional flow passages in the preferred form of slots 58, 60, 62 are provided in fin plate 42. Central slot 58 intersects with each interior channel 50, 54, 56 and also with the central discharge flow passage 52 of mounting member 44. Outer slots 60, 62 respectively intersect with each channel 50, 54, 56. Electrical resistive type heating elements 64 are embedded in mounting member 44. Connectors 64a extend out of mounting member 44 for connection to a heater control, which may be of a conventional design. These supply heat to both mounting member 44 and fin plate 42 mainly by thermal conductivity through the aluminum material.

Each slot 58, 60, 62 preferably extends between first and second surfaces 66, 68 of fin plate 42 such that these slots 58, 60, 62 each communicate with openings 70 between fins 46 and with channels 50, 54, 56. Channels 50, 54, 56 are preferably formed in second, interior surface 68 and are therefore formed at least in part by this second, interior surface 68. Alternatively, channels 50, 54, 56 may be formed in mounting member or may be channels in a one-piece platen structure. In any case, they are formed at least in part by an interior surface of the platen structure. This provides for a high flow rate of liquid material from openings 70 through fin plate 42 and into central discharge flow passage 52. It will be appreciated that one or more of the slots 58, 60, 62 may be replaced by flow passages of other shapes, configurations and orientations than the illustrated embodiment. Other one-piece or multi-piece platen structures having such interior slots, bores or other passages may be provided in accordance with the principles of this invention.

A hole 72 (not shown) is provided in passage 52 for bleeding air off while inserting platen 30 into drum 32. Once platen 30 is engaged with, for example, a solid slug of thermoplastic material within drum 32, fins 46 will begin to melt and liquify the material. This liquified material will be forced through slots 58, 60, 62 and will flow into channels 50, 54, 56 and finally into central discharge passage 52. In this embodiment, the primary motive force for moving liquified material to central discharge passage 52 will be the force of platen 30 against the slug of material. However, the movement of liquified material through the various flow passage in platen 30 may be assisted by pump 33.

Figure 5:
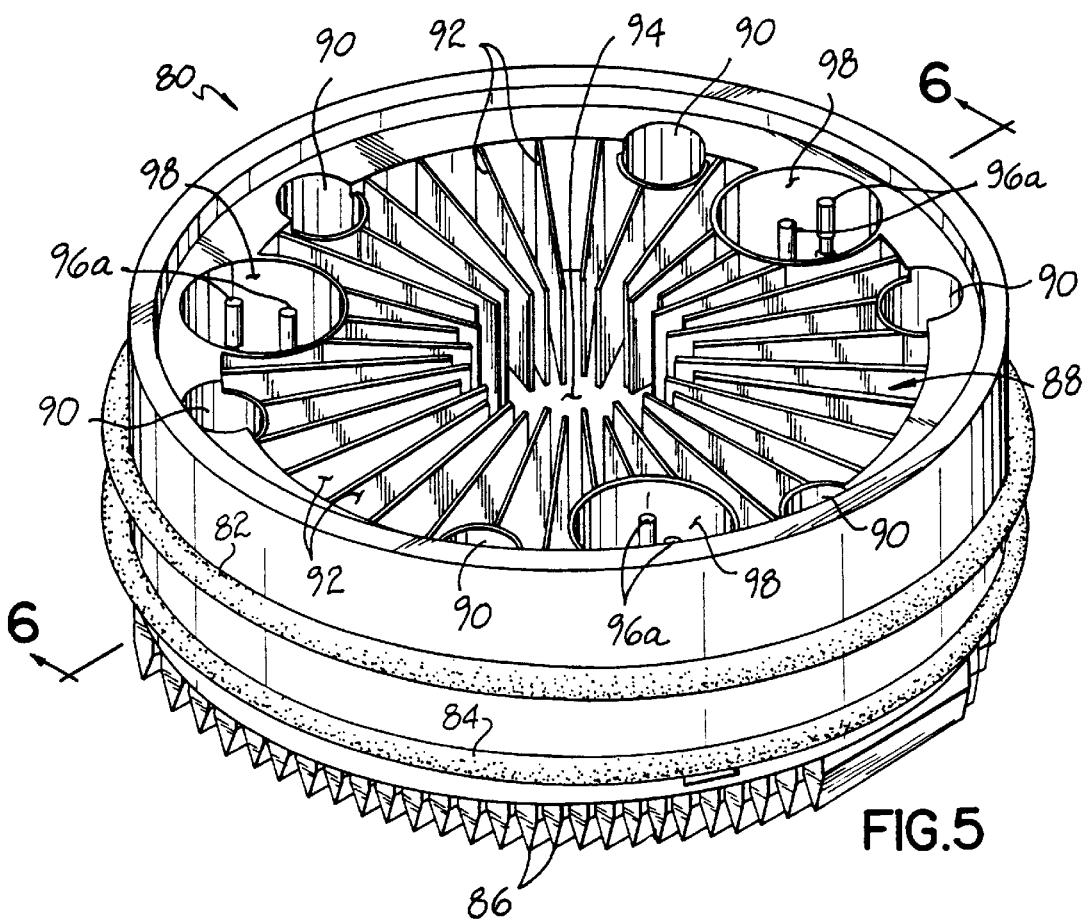
FIG. 5 is a perspective view showing a second embodiment of a platen constructed in accordance with the invention.
Figure 6:
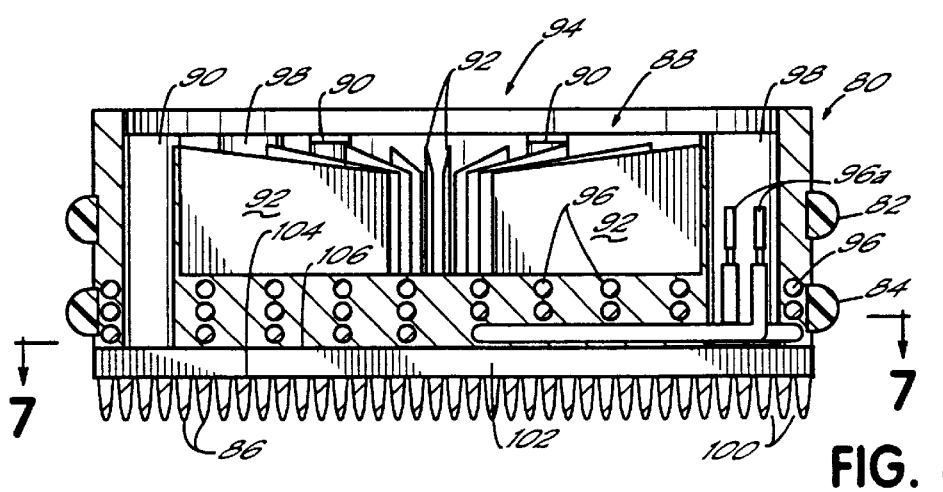
FIG. 6 is a cross sectional view of the platen shown in FIG. 5 and taken along line 6—6 thereof.
Figure 7:
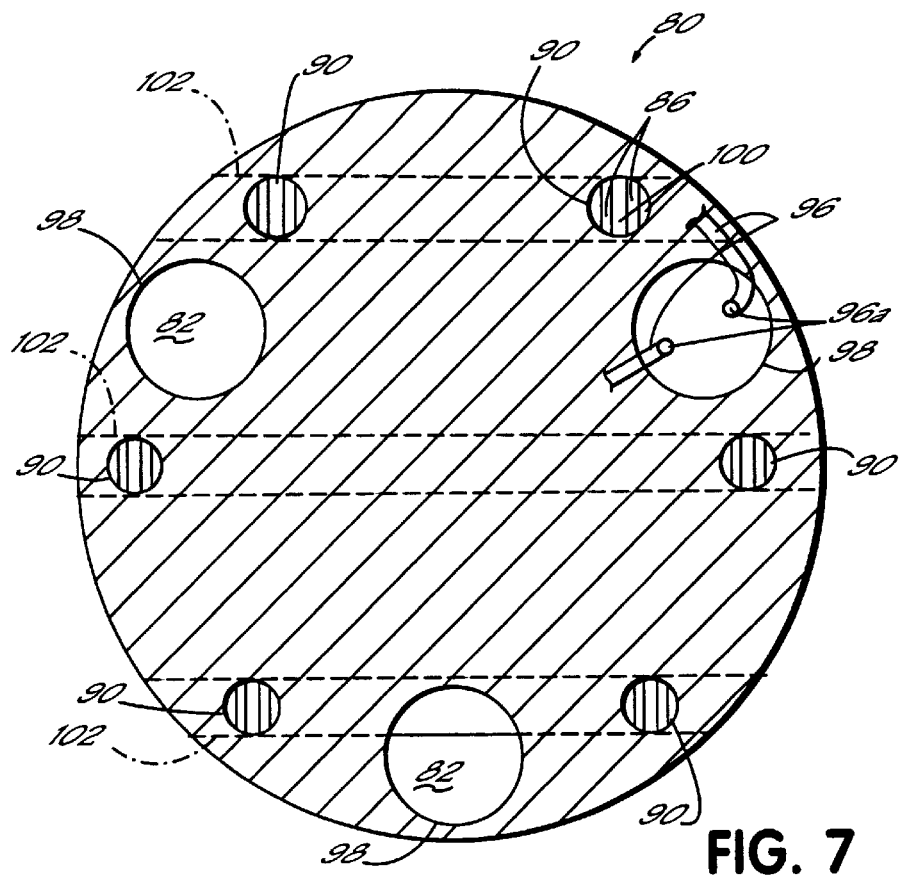
FIG. 7 is a cross sectional view of the platen shown in FIG. 6 and taken along line 7—7 thereof.

Referring now to FIGS. 5–7, a second embodiment of the invention includes platen 80 comprising a one-piece structure having outer seals 82, 84 and including a plurality of elongate fins 86, which may have the same design as described with respect to the first embodiment, for contacting and melting solid thermoplastic material. In accordance with this embodiment, a chamber 88 is provided in platen 80 for containing and heating the liquified thermoplastic material which has been melted by fins 86. Fins 86 may be of the same configuration as the first embodiment or replaced with elements of a different design. A plurality of flow passages 90 deliver the liquified thermoplastic material into chamber 88, as will be described further below. Chamber 88 includes a plurality of heating elements for supplying heat to the liquified material. The heating elements may be, for example, generally radially extending fins 92. A central area 94 is preferably free of any fins 92 for receiving a suitable pump (not shown), as in the first embodiment. A plurality of electric heating elements 96 are also embedded within plate 80 and include electrical connector portions 96a extending upwardly through appropriate channels 98 within platen 80.

With reference to FIGS. 6 and 7, each flow passage 90 communicates with at least one additional flow passage for transferring liquified thermoplastic material generally from openings 100 between adjacent fins 86 into chamber 88. In the illustrated embodiment, these additional flow passages take the preferred form of elongate slots 102, although other shapes, configurations and orientations may be used to advantage as well. Each elongate slot 102 communicates with at least two flow passages 90. Platen 80 is constructed of a highly thermally conductive material, such as cast aluminum. A suitable pump (not shown) may be located within central area 94 and connected to platen 80 in a suitable manner, such as described with regard to the first embodiment. Thus, when chamber 88 fills with a sufficient level of liquified material through the engagement of heated platen 80 against unmelted material, the pump may begin pumping the material from chamber 88. During this time, fins 92 supply additional heat to the liquified material and, during a drum changeover, the material remaining in chamber 88 may continue being pumped to downstream dispensing devices at an elevated temperature.

Figure 8:
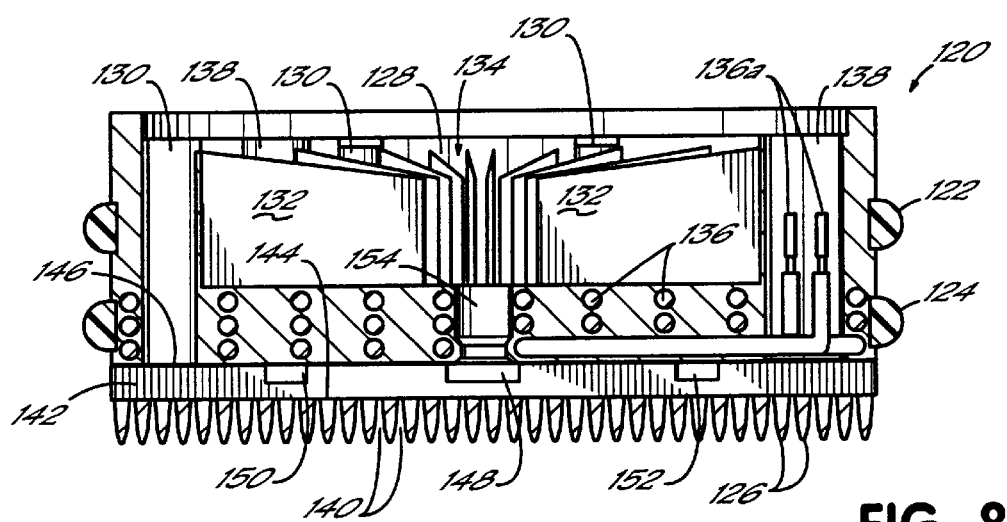
FIG. 8 is a cross sectional view similar to FIG. 6 but showing another alternative construction of the platen.

Referring to FIG. 8, a third alternative platen 120 combines various features of the first two embodiments. More specifically, platen 120 preferably comprises a one-piece structure cast from a highly conductive metal, such as aluminum, but multi-piece structures may be used as well. Platen 120 includes a pair of outer seals 122, 124 and a plurality of elongate fins 126, which may be of the same configuration discussed with respect to the first two embodiments or replaced with elements of a different design. Platen 120 further includes a chamber 128 communicating with a plurality of flow passages 130, similar to those described with respect to the second embodiment. Chamber 128 includes generally radially directed fins 132 extending to a central area 134 which is adapted to receive a pump (not shown) such as generally described with respect to the first embodiment. Fins 132 are also formed of a heat conductive metal for heating liquified thermoplastic material contained within chamber 128. For supplying the heat, a plurality of electrical resistive-type heating elements 136 are preferably cast within platen 120 and have connecting ends 136a disposed within channels 138, similar to the second embodiment.

Fins 126 have openings 140 therebetween which communicate with a plurality of elongate slots 142, only one of which is shown in FIG. 8. The remaining slots may, for example, be of the same general configuration as shown in FIG. 7. In accordance with this embodiment, a plurality of interior channels or flow passages 148, 150, 152 are provided for reasons similar to the first embodiment. These channels 148, 150, 152 intersect with the slots 142 and may also communicate with a central discharge flow passage 154 in platen 120 which, in turn, communicates with chamber 128. In this embodiment, liquified thermoplastic material may be drawn from openings 140 between fins 126, through slots 142 and into channels 148, 150, 152. Liquified thermoplastic material may be moved into central discharge flow passage 154 or may flow into peripheral flow passages 130 in order to reach the interior of chamber 128. In this embodiment, liquified material is moved through the various flow passages of the platen primarily by the force of the platen against the unmelted material. In chamber 128, the liquified material may be heated by fins 132 and ultimately drawn into a pump (not shown) disposed in central area 134.

While the present invention has been illustrated by a description of various embodiments and while these embodiments have been described in some detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method as shown and described. This has been a description of the present invention, along with the preferred methods of practicing the present invention as currently known. However, the invention itself should only be defined by the appended claims, wherein I claim:

1. Apparatus for heating material, the apparatus comprising:
    a platen including a first, exterior surface and a second, interior surface, the first surface including a plurality of parallel fins with openings therebetween for contacting and heating the material, each fin having a length extending from one peripheral portion of the platen to another peripheral portion of the platen, the platen further including a plurality of flow passages extending across the lengthwise direction of the fins for receiving liquified material at the openings between the fins and a plurality of channels formed at least in part by the second surface, said flow passages extending across said channels and communicating with said channels, and said channels adapted for fluid communication with a pump used to direct liquified material away from the platen, and
    at least one heater thermally coupled to the fins for supplying heat to the material.

2. The apparatus of claim 1 further comprising a pump connected for communication with the flow passages and channels for pumping the liquified material away from the platen.

3. The apparatus of claim 1 further comprising an actuator connected with the platen for moving the platen into a container of the material.

4. The apparatus of claim 1, wherein the platen further comprises a fin plate including said fins thereon and connected with a mounting member, and said flow passage extends through the fin plate and is located between the fins and the mounting member.

5. The apparatus of claim 4, wherein the first and second spaced apart surfaces are on the fin plate and the second surface abuts the mounting member.

6. The apparatus of claim 1 wherein the flow passages further comprise a plurality of elongate slots extending transversely between the first and second surfaces and in a direction across the lengths of the fins, wherein the elongate channels intersect the elongate slots for providing a fluid flow path therebetween.

7. The apparatus of claim 6, wherein the elongate slots and the elongate channels are disposed at two different elevations when the platen is viewed in transverse cross section.

8. The apparatus of claim 1, wherein the platen further comprises a plate including said fins thereon and connected with a mounting member, and said flow passages extend through the plate and are located between the fins and the mounting member.

9. The apparatus of claim 1, wherein the platen includes a one-piece structure and the flow passages and channels are formed in the one-piece structure.

10. The apparatus of claim 1, wherein the channels further include a central channel and a pair of additional channels on opposite sides of said central channel, each of said channels intersecting said flow passages.

11. The apparatus of claim 10, wherein said platen further comprises a central discharge flow passage adapted to communicate with said pump and intersecting said central channel and said central channel has a larger flow area than said additional channels.

12. The apparatus of claim 1, wherein the flow passages further include a central flow passage and a pair of additional flow passages on opposite sides of said central flow passage, each of said flow passages intersecting said channels.

13. The apparatus of claim 12, wherein said platen further comprises a central discharge flow passage adapted to communicate with said pump and intersecting said central flow passage and said central flow passage has a larger flow area than said additional flow passages.

14. Apparatus for heating material, the apparatus comprising:
    a platen including a first, exterior surface and a second, interior surface, the first surface including a plurality of projecting fins with openings therebetween for contacting and heating the material, the platen further including at least one flow passage for receiving liquified material at the openings between the fins and at least one channel formed at least in part by the second surface, said flow passage communicating with said channel, and said elongate channel adapted for fluid communication with a pump used to direct liquified material away from the platen, and
    at least one heater thermally coupled to the heat exchanging elements for supplying heat to the material,
    wherein the fins have leading edges and trailing edges and each fin further has a width defined at the trailing edge and a length, and wherein the ratio of the length to the width is about 3.

15. Apparatus for heating material, the apparatus comprising:
    a platen including a first, exterior surface and a second, interior surface, the first surface including a plurality of projecting fins with openings therebetween for contacting and heating the material, the platen further including at least one flow passage for receiving liquified material at the openings between the fins and at least one channel formed at least in part by the second surface, said flow passage communicating with said channel, and said elongate channel adapted for fluid communication with a pump used to direct liquified material away from the platen, and at least one heater thermally coupled to the heat exchanging elements for supplying heat to the material, wherein the fins have lengths, leading edges, trailing edges, and an opening width defined at the opening between adjacent fins at the trailing edges, and wherein the ratio between the length and the opening width is about 9.

16. Apparatus for heating material, the apparatus comprising:

a platen including a first, exterior surface and a second, interior surface, the first surface including a plurality of projecting fins with openings therebetween for contacting and heating the material, the platen further including at least one flow passage for receiving liquified material at the openings between the fins and at least one channel formed at least in part by the second surface, said flow passage communicating with said channel, and said elongate channel adapted for fluid communication with a pump used to direct liquified material away from the platen, and at least one heater thermally coupled to the heat exchanging elements for supplying heat to the material, wherein the fins have tapering side surfaces which converge to a leading edge, and the angle between the tapering side surfaces is about 30°.

17. Apparatus for heating material, the apparatus comprising:

a platen including first and second sides, a first plurality of heat exchanging elements extending from the first side and adapted to contact and heat the material, and a chamber on the second side communicating with the first side through a flow passage, the chamber being adapted for connection with a pump for pumping liquified material out of the chamber, the interior of the chamber further including a second plurality of projecting heat exchanging elements for heating the liquified material, and at least one heater thermally coupled to the first and second pluralities of heat exchanging elements for supplying heat to the material.

18. The apparatus of claim 17, further comprising a pump connected for communication with the chamber for pumping the liquified material away from the platen.

19. The apparatus of claim 17, further comprising an actuator connected with the platen for moving the platen into a container of the material.

20. The apparatus of claim 17, wherein the first plurality of heat exchanging elements include elongate fins extending from the first side the platen.

21. The apparatus of claim 17, wherein the fins have leading edges and trailing edges and each fin further has a width defined at the trailing edge and a length, and wherein the ratio of the length to the width is about 3.

22. The apparatus of claim 17, wherein the fins have lengths, leading edges, trailing edges, and an opening width defined at the opening between adjacent fins at the trailing edges, and wherein the ratio between the length and the opening width is about 9.

23. The apparatus of claim 17, wherein the platen further comprises a plate connected with a mounting member, the plate having first and second surfaces with the fins being disposed on the first surface and with the second surface facing the mounting member.

24. The apparatus of claim 17 further comprising a plurality of flow passages communicating between the first side of the platen and the interior of the chamber for delivering liquified material to the chamber.

25. The apparatus of claim 17, wherein the second plurality of heat exchanging elements further comprise fins.

26. The apparatus of claim 17, further comprising at least one slot communicating with openings disposed between adjacent heat exchanging elements of the first plurality of heat exchanging elements and communicating with the flow passage, the slot thereby directing liquified material to the flow passage and into the interior of the chamber.

27. The apparatus of claim 17, further comprising a plurality of the flow passages communicating between the first side of the platen and the interior of the chamber, and a plurality of the slots communicating with openings between adjacent heat exchanging elements of the first plurality of heat exchanging elements and communicating with the plurality of flow passages, the plurality of slots thereby directing liquified material to the flow passages.

28. The apparatus of claim 27, wherein each slot intersects at least two of the flow passages.

29. The apparatus of claim 17 further comprising a central area in the chamber which is free of heat exchanging elements and is adapted to receive a pump.

30. A method of unloading a container of material using a heated platen, the method comprising:

engaging a plurality of parallel fins of the heated platen with the material to produce liquified, heated material, said fins each extending from one peripheral portion of the platen to another peripheral portion of the platen, moving the liquified, heated material through a plurality of flow passages in the platen which communicate with openings between the fins, and moving the heated, liquified material from the flow passages into a plurality of channels in the platen communicating with a discharge flow passage to deliver the heated, liquified material to a side of the platen opposite the fins.

31. The method of claim 30, wherein pumping the material through a plurality of flow passages further comprises:

moving the material through a plurality of elongate slots which intersect with the plurality of channels.

32. The method of claim 30 further comprising:

moving the material into a chamber in the platen, and supplying additional heat to the material with a plurality of projecting heating elements disposed in the chamber.

33. The method of claim 32, wherein the material is heated with said fins on the platen and additional fins in the chamber, said fins on the platen and in the chamber being thermally coupled to at least one heater embedded in the platen.

34. A method of unloading a container of material using a heated platen having a plurality of projecting heat exchanging elements, the method comprising:

engaging the plurality of projecting heat exchanging elements with the material to produce liquified, heated material, directing the liquified, heated material into a chamber disposed on a side of the platen opposite to the projecting heating elements, supplying additional heat to the liquified, heated material in the chamber using a projecting heat exchanging element in the chamber, and pumping the material out of the chamber.

35. The method of claim 34 wherein the step of supplying additional heat further comprises:

heating the material in the chamber using a plurality of heated fins.

* * * * *

UNITED STATES PATENT AND TRADEMARK OFFICE
CERTIFICATE OF CORRECTION

PATENT NO.   : 6,046,437
DATED        : April 4, 2000
INVENTOR(S)  : Paul S. Frates It is certified that error appears in the above-identified patent and that said Letters Patent is hereby corrected as shown below:

Column 2,
Line 67, change "leas" to --least--.

Column 3,
Line 1, delete "t".
Line 1, change "Th e" to --The--.

Column 5,
Line 19, change "a" to --$\alpha$--.
Line 24, change "P" to --$\beta$--.
Line 25, change "15⅔" to --1⅔--.

Signed and Sealed this

Seventeenth Day of July, 2001

*Attest:*

NICHOLAS P. GODICI
*Attesting Officer*   *Acting Director of the United States Patent and Trademark Office*